(12) United States Patent
Spielvogel et al.

(10) Patent No.: US 9,441,747 B2
(45) Date of Patent: Sep. 13, 2016

(54) PRESSURE/FLOW REGULATOR

(75) Inventors: Christian Spielvogel, Eutingen (DE);
Friedemann Nordt, Eutingen (DE);
Carola Diebold, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 909 days.

(21) Appl. No.: 13/641,487

(22) PCT Filed: Mar. 30, 2011

(86) PCT No.: PCT/EP2011/001610
§ 371 (c)(1),
(2), (4) Date: Dec. 24, 2012

(87) PCT Pub. No.: WO2011/128027
PCT Pub. Date: Oct. 20, 2011

(65) Prior Publication Data
US 2013/0199631 A1 Aug. 8, 2013

(30) Foreign Application Priority Data

Apr. 16, 2010 (DE) .................. 10 2010 015 186
Oct. 9, 2010 (DE) .................. 10 2010 048 070

(51) Int. Cl.
*F16K 1/00* (2006.01)
*F16K 17/00* (2006.01)
*F04B 49/00* (2006.01)
*F15B 11/16* (2006.01)

(52) U.S. Cl.
CPC ............. *F16K 17/00* (2013.01); *F04B 49/002* (2013.01); *F15B 11/165* (2013.01); *F15B 2211/20553* (2013.01); *Y10T 137/7793* (2015.04)

(58) Field of Classification Search
CPC ................................. Y10T 137/87169
USPC .................................. 137/454.4
See application file for complete search history.

(56) References Cited

U.S. PATENT DOCUMENTS

| | | | | |
|---|---|---|---|---|
| 4,699,571 A | * | 10/1987 | Bartholomaus | ........... 417/213 |
| 5,778,924 A | * | 7/1998 | Stangl et al. | ............. 137/269 |
| 7,044,442 B2 | * | 5/2006 | Belser | ............. 251/176 |
| 7,341,434 B2 | * | 3/2008 | Belser | ............. 417/218 |

FOREIGN PATENT DOCUMENTS

| | | |
|---|---|---|
| DE | 199 04 616 A1 | 8/2000 |
| DE | 101 36 416 A1 | 2/2003 |
| EP | 0 305 761 A2 | 3/1989 |

OTHER PUBLICATIONS

International Search Report corresponding to PCT Application No. PCT/EP2011/001610, mailed Aug. 11, 2011 (German and English language document) (6 pages).
Sauer Danfoss, Series 45 Axial Piston Open Circuit Pumps Technical Information, 520L0519 Rev FN, Jul. 2009 (108 pages).

\* cited by examiner

*Primary Examiner* — Nathaniel Wiehe
*Assistant Examiner* — Dustin T Nguyen
(74) *Attorney, Agent, or Firm* — Maginot, Moore & Beck LLP

(57) ABSTRACT

A pressure/flow regulator includes a pressure control valve, a flow control valve, and a first control connection configured to set a variable displacement pump. The control connection is configured to be discharged to a tank by the flow control valve via a control edge of the pressure control valve that is open in the idle position of a valve piston of the pressure control valve.

5 Claims, 4 Drawing Sheets

PRESSURE/FLOW REGULATOR

This application is a 35 U.S.C. §371 National Stage Application of PCT/EP2011/001610, filed on Mar. 30, 2011, which claims the benefit of priority to Serial No. DE 10 2010 015 186.6, filed on Apr. 16, 2010 in Germany and DE 10 2010 048 070.3 filed on Oct. 9, 2010 in Germany, the disclosures of which are incorporated herein by reference in their entirety.

BACKGROUND

The disclosure relates to a pressure/flow regulator.

Pressure/flow regulators have a pressure control valve and a flow control valve with in each case one valve bore and a common control pressure connection, via which a pivoting angle of a variable displacement pump is regulated.

The document DE 101 36 416 A1 and the brochure from Sauer Danfoss 520L0519 Rev FN July 2009 disclose pressure/flow regulators, in which the pressure medium which is regulated by the flow control valve to the control pressure connection always passes the pressure control valve.

The document DE 101 36 416 A1 and the document DE 199 04 616 A1 each disclose a pressure/flow regulator, the pressure control valve of which connects the control connection to a tank via a control edge of the flow regulator, which control edge is open in the rest position of the flow control valve.

In all the abovementioned documents, a pivoting angle of a variable displacement pump is regulated via the pressure medium, which is regulated in this way, of the control connection.

A disadvantage of the cited pressure/flow regulators is the outlay which is required for the production of the channels.

In contrast, the disclosure is based on the object of providing a pressure/flow regulator with reduced production outlay.

SUMMARY

This object is achieved by a pressure/flow regulator having the features of the disclosure.

The pressure/flow regulator according to the disclosure has a pressure control valve and a flow control valve and a first control connection, it being possible for the control connection to be relieved to a tank by the flow control valve via a control edge of the pressure control valve, which control edge is open in a rest position of a valve piston of the pressure control valve. The production outlay for the pressure/flow regulator is therefore reduced, since the channels are of less complicated design.

Further advantageous refinements of the disclosure are described in the dependent patent claims.

In one particularly preferred application, a pivoting angle of a variable displacement pump is set via the pressure/flow regulator. To this end, the first control connection is capable of being connected or is connected permanently to an actuating chamber of an actuating cylinder of the variable displacement pump.

The control connection is preferably connected via a first straight channel to the pressure control valve and to the flow control valve, the first channel intersecting a valve bore of the pressure control valve and a valve bore of the flow control valve approximately at right angles.

In one preferred development, the valve piston is received in the valve bore of the pressure control valve, it not being possible for the first channel to be interrupted by the valve piston.

It is preferred here if a control collar of the valve piston of the pressure control valve is narrower than the first channel, with the result that the control collar can be flowed around. The connection from the flow control valve to the control connection therefore cannot be shut off by the valve piston of the pressure control valve.

One preferred development of the pressure/flow regulator according to the disclosure has a tank connection which is connected via a second straight channel to the pressure control valve and to the flow control valve.

It is preferred here if the second channel also intersects the valve bore of the pressure control valve approximately at right angles and intersects the valve bore of the flow control valve approximately at right angles or opens into said valve bore.

If the second channel is narrower than a control collar, which is arranged there, of the valve piston of the pressure control valve, the second channel can be shut off by the control collar of the pressure control valve.

One preferred development of the pressure/flow regulator according to the disclosure has a second control connection which is connected to a working line of the variable displacement pump, with the result that pump pressure prevails at the control connection. Here, the control connection is connected to a respective end-side pressure space of the pressure control valve and of the flow control valve, so that, as a result of the pump pressure, a force in the opening direction acts on the two valve pistons.

Here, in one development, the control connection is connected via a third straight channel to the two pressure spaces, the third channel also intersecting the valve bore of the pressure control valve and the valve bore of the flow control valve approximately at right angles.

The second channel and the third channel preferably extend parallel to the first channel. As a result, the production outlay for the channels is reduced.

The first channel and/or the second channel and/or the third channel are/is preferably a bore. The channels can therefore be produced simply by way of a drill.

A prestress of a spring of the pressure control valve or of a spring of the flow control valve can preferably be set via a sleeve which is clamped into the associated valve bore, which spring counteracts a pressure of the second control connection. Production tolerances and material fatigue of the spring can be corrected in this way.

It is preferred here if the sleeve is a conical sleeve, in which a truncated cone is clamped. This solution is simple in terms of device technology.

Or the prestress of the springs of the pressure control valve and of the flow control valve can be set in a classic way via a setting screw which is screwed into the associated valve bore.

In one preferred development of the pressure/flow regulator according to the disclosure, the spring of the pressure control valve is arranged in a spring space which is relieved to the tank, which spring counteracts a pressure of the second control connection.

In one preferred development of the pressure/flow regulator according to the disclosure, the spring of the flow control valve is arranged in a spring space which is connected via a load signaling connection to at least one consumer which is supplied by the variable displacement pump, which spring counteracts a pressure of the second control connection.

BRIEF DESCRIPTION OF THE DRAWINGS

In the following text, different exemplary embodiments of the disclosure will be described in detail using the figures, in which.

DETAILED DESCRIPTION

Figure 1:
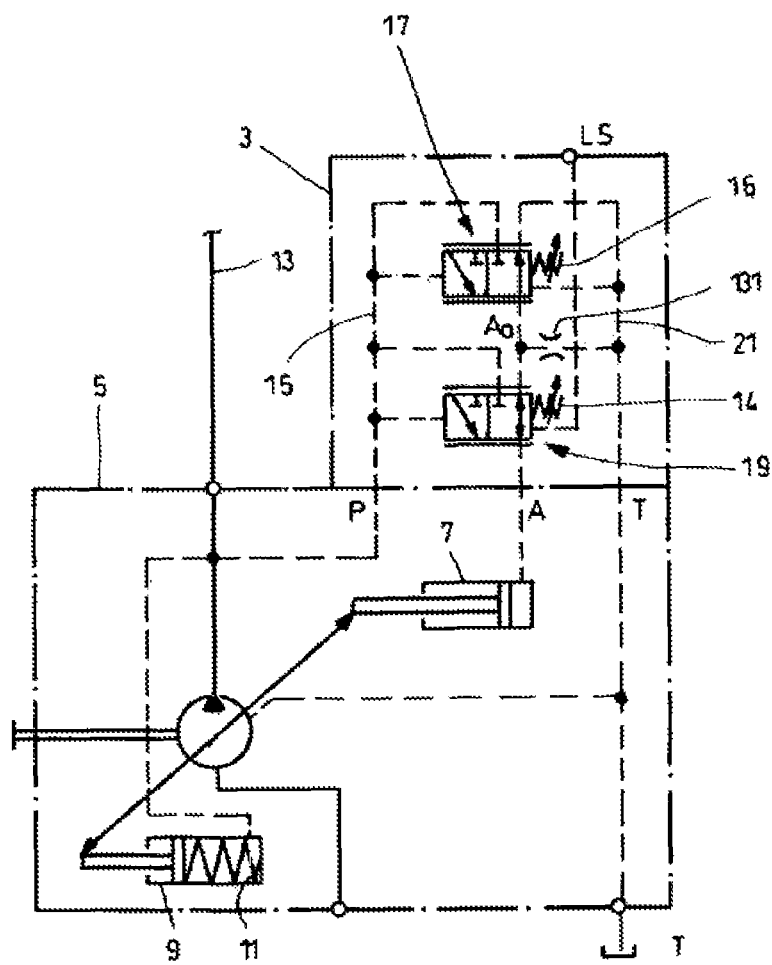
FIG. 1 shows a hydraulic circuit diagram of a pressure/flow regulator according to the disclosure having a variable displacement pump.
Figure 2:
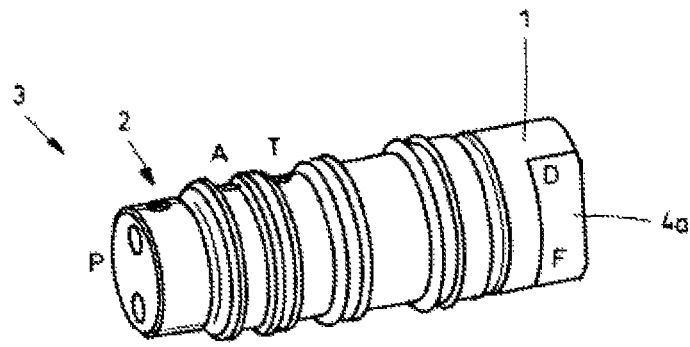
FIG. 2 shows a first exemplary embodiment of a pressure/flow regulator according to the disclosure, in a perspective view.
Figure 3:
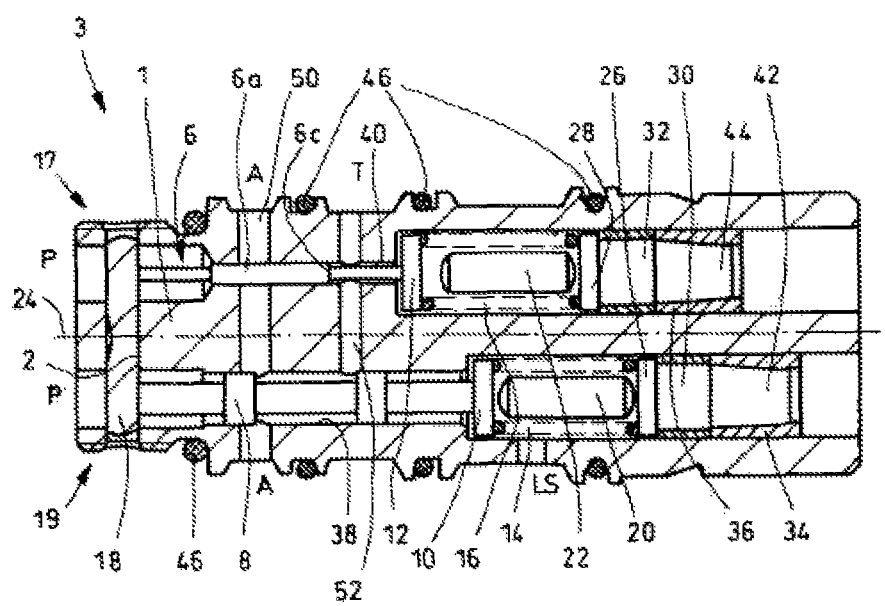
FIG. 3 shows the first exemplary embodiment of a pressure/flow regulator according to the disclosure, in lateral section.
Figure 4:
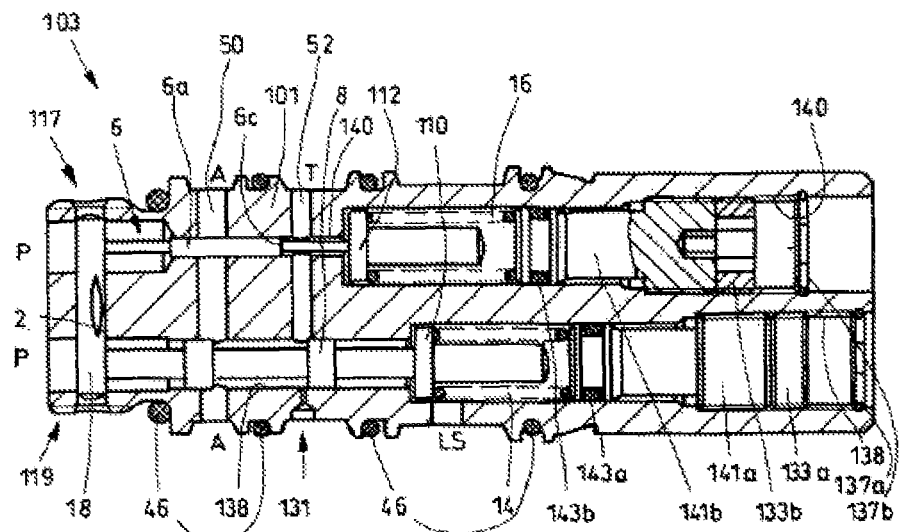
FIG. 4 shows a second exemplary embodiment of a pressure/flow regulator according to the disclosure, in lateral section.
Figure 5:
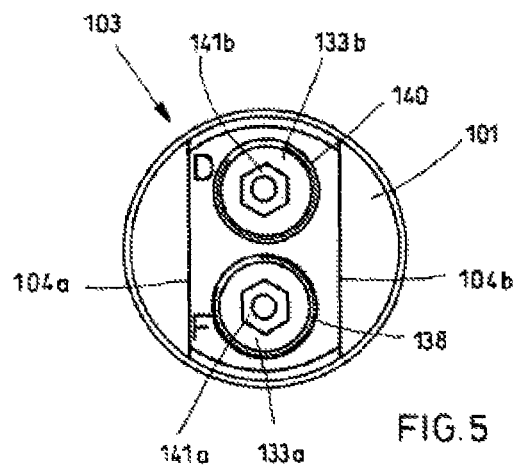
FIG. 5 shows the second exemplary embodiment of a pressure/flow regulator according to the disclosure, in a plan view.
Figure 6:
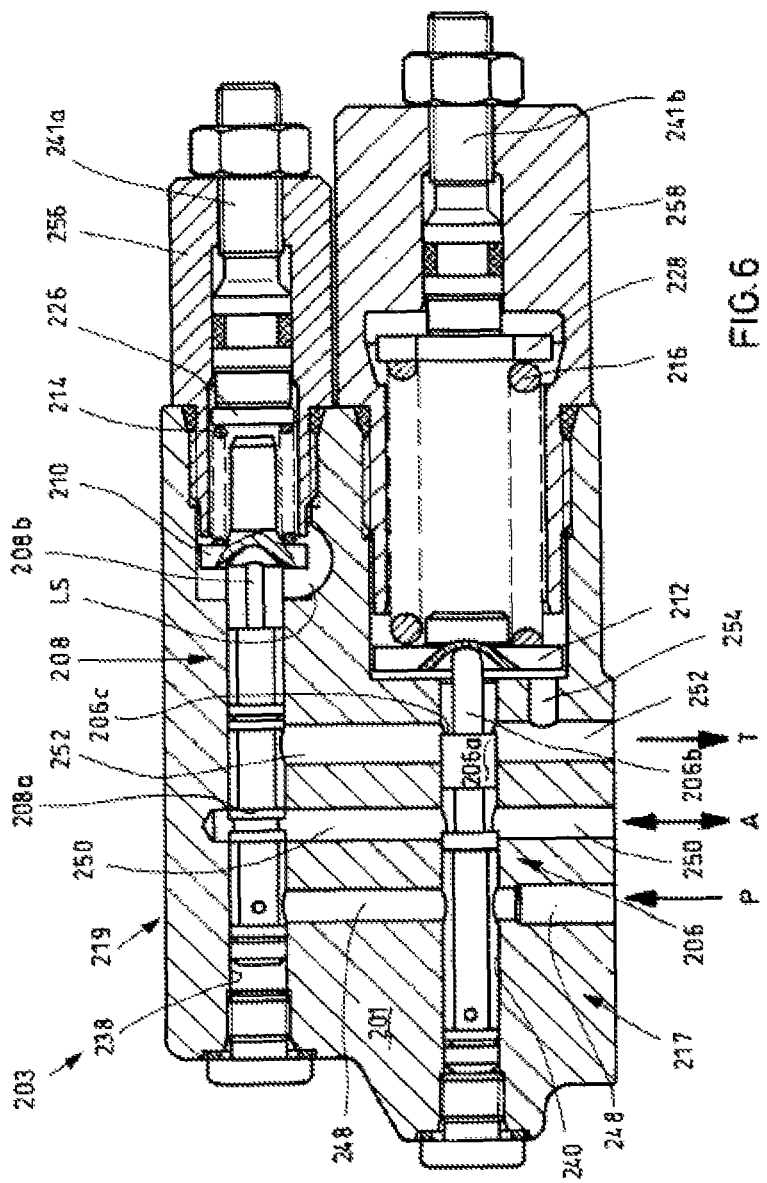
FIG. 6 shows a third exemplary embodiment of a pressure/flow regulator according to the disclosure, in lateral section.

The circuit diagram of the pressure/flow regulator 3 according to FIG. 1 applies, in particular, to that exemplary embodiment of the pressure/flow regulator which is shown in FIGS. 4 and 5, with a transverse bore 131 which forms a throttle. The circuit diagram of the pressure/flow regulator 3 according to FIG. 1 also applies largely to the exemplary embodiment which is shown in FIGS. 2 and 3 and to the exemplary embodiment which is shown in FIG. 6.

A pivoting angle of the variable displacement pump 5 can be changed via two actuating cylinders 7 and 9. In order to reduce the pivoting angle, pressure medium is fed via the control pressure connection A to the actuating cylinder 7, via the pressure/flow regulator 3. This is counteracted by the further actuating cylinder 9, in which the pump pressure prevails. In order to increase the pivoting angle, the actuating cylinder 7 is connected to tank via the pressure/flow regulator 3, with the result that the variable displacement pump 5 is adjusted in the direction of greater pivoting angles by way of the pressure force of the actuating cylinder 9 and the force of a spring 11. Via the pivoting angle which is set in this way, the pressure and the delivery quantity are regulated on a working line 13 of the variable displacement pump 5.

Furthermore, the pressure/flow regulator 3 and the variable displacement pump 5 have a common tank connection T. Moreover, The pressure/flow regulator 3 has a load signaling connection LS, via which the highest working pressure is signaled from a plurality of consumers which are supplied by the variable displacement pump 5 via the working line 13. If only one consumer is supplied, its working pressure is signaled.

The pressure/flow regulator 3 has a pressure control valve 17 and a flow control valve 19. Both valves 17, 19 are configured as proportionally adjustable ½-way valves and in each case have an adjustable spring 14, 16 which acts in the direction of the rest position (shown in FIG. 1) of a respective valve piston of the valves 17, 19. In these two rest positions, the actuating cylinder 7 is relieved to the tank T via the control pressure connection A, via the two valves 17, 19 and via a tank line 21, with the result that the pivoting angle of the variable displacement pump 5 is set to its maximum. The above-described control pressure which prevails at the load signaling connection LS likewise acts in the direction of the shown rest position of the flow control valve 19.

Furthermore, the pump pressure in the working line 13 acts on the valve pistons of the valves 17, 19 via the connection P and the control pressure line 15. If the force which is generated by the pump pressure which prevails in the working line 13 is greater than the respective counterforce, the valve pistons of the valves 17, 19 are therefore set in such a way that pressure medium is fed to the actuating cylinder 7 via the control pressure connection P, the control pressure line 15 and the control pressure connection A, and the variable displacement pump 5 is therefore pivoted back.

Both valves 71, 19 are shown in their respective rest positions, in which the corresponding valve pistons (cf. FIGS. 3, 4 and 6) are in their respective rest positions.

An outlet $A_D$ of the pressure control valve 17 is connected via the flow control valve 19 to the control connection A of the pressure/flow regulator 3 and/or the variable displacement pump 5.

In the shown rest position of the pressure control valve 17, the flow control valve 19 can produce the necessary connections. When the pressure control valve 17 begins to regulate, the flow control valve 19 is situated in the rest position, since the pressure at the load signaling connection LS has approached the pressure at the control connection P (pump pressure). The pressure control valve can then produce the different connections.

FIG. 2 shows a first exemplary embodiment of a pressure/flow regulator 3 according to the disclosure, the housing of which is configured as an insertion cartridge 1. The latter can be screwed in a spacesaving manner into a variable displacement pump (not shown).

The control pressure connection A and the tank connection T are arranged on the outer circumference of the insertion cartridge 1, whereas the control pressure connection P is provided on the end side. Said control pressure connection P serves to "signal" the pump pressure of the variable displacement pump 5 (not shown in FIG. 2), each of the two valves 17, 19 being assigned a bore of the control pressure connection P. The control pressure connection A serves to set the pivoting angle of the variable displacement pump 5 via the actuating cylinder 7, and the tank connection T is connected to the tank (cf. FIG. 1).

A continuous transverse bore 2 which will be explained with reference to FIG. 3 is provided adjacently to the control pressure connection P in the insertion cartridge 1. In order to screw in the insertion cartridge 1 into the variable displacement pump, a dihedron is provided, of which only a flat section 4a is shown in FIG. 1.

FIG. 3 shows the first exemplary embodiment of a pressure/flow regulator 3 according to the disclosure, in a sectioned illustration. The pressure control valve 17 has a valve piston 6, and the flow control valve 19 has a valve piston 8. The valve pistons 6, 8 are prestressed to the left (in FIG. 3) into their shown rest position via in each case one flat spring collar 10, 12 by in each case one spring 14, 16. The movement of the valve pistons 6, 8 to the left (in FIG. 3) is limited by a stop pin 18 which is pressed into the continuous transverse bore 2.

Via the control pressure which prevails at the control pressure connection P, the valve pistons 6, 8 and the associated spring collars 10, 12 can be displaced proportionally to the right (in FIG. 3) into their switching positions. This movement counter to the force of the springs 14, 16 is limited by respective cylindrical stop pins 20, 22 which are received in the interior of the respective spring 14, 16 parallel to a center axis 24 of the pressure/flow regulator 3.

The springs 14, 16 are supported in each case on a disk 26, 28 which are supported in each case via a spacer sleeve 30, 32 on a respective conical sleeve 34, 36. The two conical sleeves 34, 36 are fixed frictionally in the respective valve bore 38, 40. To this end, the conical sleeves 34, 36 have frustoconical inner recesses, into which corresponding truncated cones 42, 44 are pressed. The pressing-in operation took place during the mounting of the pressure/flow regulator 3 by displacement or pulling of the truncated cones 42, 44 in the associated conical sleeves 34, 36 to the right (in FIG. 3).

The load signaling connection LS is provided as a further connection of the flow control valve 19. A spring space of the flow control valve 19 is connected via a transverse bore to the load signaling connection LS, whereas a spring space of the pressure control valve 17 is connected to the tank connection T via a pressure-medium connection which is formed between the valve piston 6 and the valve bore 40 and via a transverse bore section.

In each case one sealing ring 46 is arranged on the outer circumference of the insertion cartridge 1 between the right-hand (in FIG. 3) or outer end section of the insertion cartridge 1 and the load signaling connection LS, and between the load signaling connection LS and the tank connection T, and between the control pressure connection A and the control pressure connection P.

As a result of the rest positions, which are shown in FIG. 3, of the valve pistons 6, 8, connections between the control pressure connections A and P are shut off by a respective piston collar of the two valve pistons 6, 8, whereas the control pressure connection A is connected to the tank connection T via two transverse bore sections and via a pressure-medium connection which is formed between the valve piston 8 and the valve bore 38 and via two transverse bore sections, and is therefore relieved to the tank. As a result of pressure loading (of the two bores) of the control pressure connection P, the two valve pistons 6, 8 can be displaced to the right (in FIG. 3) in each case counter to the force of the associated spring 14, 16, both valves 17, 19 opening a connection from the control pressure connection P to the control pressure connection A. The variable displacement pump 5 (cf. FIG. 1) is therefore pivoted back, with the result that its pressure and/or its flow are/is reduced. The pressure control valve 17 has decision priority ahead of the flow control valve 19.

FIG. 4 shows a second exemplary embodiment of a pressure/flow regulator 103 according to the disclosure, in lateral section. Here, only the differences from the first exemplary embodiment according to FIG. 3 will be explained in the following text: a transverse bore 131 is provided between the outer circumference of the insertion cartridge 101 and the pressure-medium connection which is formed between the valve bore 138 and the valve piston 8 of the flow control valve 119, which transverse bore 131, on account of its small diameter, represents a throttled connection between the pressure-medium connection and the tank connection T.

Spring collars 110, 112 are formed in each case integrally with a stop pin.

Setting screws 141a, 141b are screwed into the valve bores 138, 140 via a respective hexagon socket and therefore serve to set the respective prestress of the springs 14, 16. The setting screws 141a, 141b are fixed by way of respective lock screws 133a, 133b which are likewise screwed into the respective valve bore 138, 140. The lock screws 133a, 133b in each case have a continuous hexagon socket which is larger than the respective hexagon socket of the setting screws 141a, 141b.

Furthermore, a securing ring 137a, 137b is inserted into each valve bore 138, 140, with the result that the setting screws 141a, 141b and their lock screws 133a, 133b are secured against falling out and, in particular, against falling out in a pressure-loaded manner.

Finally, an intermediate piece with sealing ring 143a, 143b lies between the respective spring 14, 16 and the associated setting screw 141a, 141b in order to seal, in particular, the pressure space, loaded with load signaling pressure, of the flow control valve 119 with respect to the surroundings.

FIG. 5 shows the second exemplary embodiment according to FIG. 4, in an end-side view. The dihedron which consists of the two parallel flat sections 104a, 104b affords the possibility of bringing a special tool (not shown) into contact and screwing the insertion cartridge 101 in and out. The stepped sizes firstly of the hexagon socket of the lock screws 133a, 133b and secondly of the setting screws 141a, 141b in the valve bores 138, 140 can be reached at the same time.

FIG. 6 shows a third exemplary embodiment of a pressure/flow regulator 203 according to the disclosure, in lateral section. Its housing 201 is configured with a flange design. Accordingly, the two control connections A and P and the tank connection T are arranged on one side and (in FIG. 6) on the bottom of the housing 201. The control connection P is connected via a channel 248, the control connection A is connected via a channel 250 and the tank connection T is connected via a channel 252 to the pressure control valve 217 and to the flow control valve 219. Here, the channels 248, 250, 252 firstly intersect the valve bore 240 of the pressure control valve 217 and secondly open into the valve bore 238 of the flow control valve 219. The three channels 248, 250, 252 are arranged parallel to one another and extend here at right angles to the two valve bores 238, 240.

A valve piston 208 is arranged in the valve bore 238 of the flow control valve 219, and a valve piston 206 is arranged in the valve bore 240 of the pressure control valve 217. Both valve pistons 206, 208 are loaded by the pump pressure of the control connection P from the left (in FIG. 6) via the channel 248 and via a fluid path which is formed in the respective valve piston 206, 208 and consists of a continuous transverse bore and an axial blind bore. The valve piston 206 of the pressure control valve 217 is shown in its rest position on the left (in FIG. 6), whereas the valve piston 208 of the flow control valve 219 is shown in a regulating position. The valve piston 206 of the pressure control valve 217 is loaded by the force of the spring 216 from the right (in FIG. 6) via the spring collar 212, whereas the valve piston 208 of the flow control valve 219 is loaded by the force of the spring 214 and, moreover, by the control pressure of a load signaling connection LS from the right (in FIG. 6) via the spring collar 210. Said control pressure prevails in the spring space of the spring 214.

The spring space of the spring 216 of the pressure control valve 217 is relieved permanently to the tank connection T of the pressure/flow regulator 203 via a longitudinal channel 254 and via the channel 252. The spring 214 is supported via a disk 226 on a setting screw 241a, whereas the spring 216 is supported via a disk 228 on a setting screw 241b. Both setting screws 241a, 241b are screwed into respective stop bushes 256, 258 which are in turn screwed into the housing 201 of the pressure/flow regulator 203. The two stop bushes 256, 258 serve as stops for the respectively assigned spring collar 210, 212 and therefore as travel limit for the respectively assigned valve piston 206, 208.

That end section of the valve piston 208 which bears against the spring collar 210 is configured as a guide collar which has at least one flattened portion 208b in order to form a pressure-medium connection.

That end section of the valve piston 206 which bears against the spring collar 212 is configured as a neck 206b in order to form a throttled pressure-medium connection.

The two left-hand (in FIG. 6) end sections of the valve pistons 206, 208 are configured as guide collars. Longitudinal channels are formed in the end sections, via which longitudinal channels small radial bores of the valve pistons 206, 208 are connected to the respective end-side pressure spaces, as a result of which the latter are loaded with pump pressure.

In its rest position which is shown in FIG. 6, the valve piston 206 of the pressure control valve 217 shuts off a direct pressure-medium connection from the control connection A to the tank connection T via its control collar 206a. Here, connections from the control connection A to the flow control valve 219 via the channel 250 and from the tank connection T to the flow control valve 219 via the channel 252 are not shut off in the rest position of the valve piston 206 of the pressure control valve 217. In a regulating position (not shown) of the valve piston 206 of the pressure control valve 217, the connection from the tank connection T to the flow control valve 219 is shut off, with the result that the control connection A cannot be relieved. Therefore, the pivoting angle of the variable displacement pump 5 and therefore its flow cannot be increased further.

A control collar 208a of the flow control valve 219 has a length which is somewhat greater than a bore diameter of the channel 250. In the regulating position which is shown, the control collar 208a therefore shuts off the connection from the control connection A via the channel 250 firstly to the control connection P and secondly to the tank connection T.

A pressure/flow regulator is disclosed having a pressure control valve and having a flow control valve and having a first control connection for setting a variable displacement pump, it being possible for the control connection to be relieved to a tank by the flow control valve via a control edge of the pressure control valve, which control edge is open in a rest position of a valve piston of the pressure control valve.

The invention claimed is:

1. A pressure/flow regulator, comprising:
   a pressure control valve defining a pressure control bore and including a valve piston having a control collar movable within the pressure control bore to an open position and a closed position;
   a flow control valve defining a flow control bore;
   a first straight channel intersecting the pressure control bore and the flow control bore;
   a second straight channel intersecting the pressure control bore and opening into the flow control bore;
   a first control connection connected to the first straight channel and configured to be fluidly coupled to a tank through the flow control bore, the pressure control bore, and the second straight channel when the control collar is in the open position,
   wherein a diameter of the control collar is smaller than a diameter of the first straight channel, such that fluid flows through the first straight channel past an exterior surface of the control collar without entering the pressure control bore, and
   wherein the diameter of the control collar is larger than a diameter of the second straight channel and an axial length of the control collar is longer than the diameter of the second straight channel, such that when the control collar is in the closed position the control collar prevents fluid flow through the second straight channel past the pressure control bore,
   wherein the control collar is in the open position in a rest position of the valve piston.

2. The pressure/flow regulator as claimed in claim 1, wherein the first control connection is configured to be connected to an actuating chamber of an actuating cylinder of a variable displacement pump.

3. The pressure/flow regulator as claimed in claim 1, wherein the first straight channel intersects the pressure control bore and the flow control bore approximately at right angles.

4. The pressure/flow regulator as claimed in claim 1, further comprising a tank connection which is connected via the second straight channel to the pressure control valve and to the flow control valve when the control collar is in the open position.

5. The pressure/flow regulator as claimed in claim 4, wherein the second channel intersects the pressure control bore approximately at right angles and opens into the flow control bore approximately at a right angle.

* * * * *